(12) United States Patent
De Castro et al.

(10) Patent No.: US 11,518,509 B2
(45) Date of Patent: Dec. 6, 2022

(54) TETHERED AERIAL VEHICLE WITH GIMBALED COAXIAL PROPELLERS

(71) Applicant: ALTAVE INDUSTRIA, COMERCIO E EXPORTACAO DE AERONAVES S.A., São José dos Campos (BR)

(72) Inventors: Davi Ferreira De Castro, São José dos Campos (BR); Waldir Vieira, São José dos Campos (BR); Alejandro Arturo Rios Cruz, São José dos Campos (BR); Bruno Avena De Azevedo, São José dos Campos (BR); Isamel Costa Neto, São José dos Campos (BR); Davi Lima De Mesquita, São José dos Campos (BR); Lenardo Vieira Costa, São José dos Campos (BR); Leonardo Nogueira, São José dos Campos (BR); Michelle Bueno Garcia, São José dos Campos (BR); Raphael Galate Baptista Ribeiro, São José dos Campos (BR)

(73) Assignee: ALTAVE INDUSTRIA, COMERCIO E EXPORTACAO DE AERONAVES S.A., Sao Jose dos Campos (BR)

( * ) Notice: Subject to any disclaimer, the term of this patent is extended or adjusted under 35 U.S.C. 154(b) by 433 days.

(21) Appl. No.: 16/522,032

(22) Filed: Jul. 25, 2019

(65) Prior Publication Data
US 2021/0024209 A1    Jan. 28, 2021

(51) Int. Cl.
*B64C 39/02* (2006.01)
*B64F 3/02* (2006.01)

(52) U.S. Cl.
CPC .............. *B64C 39/022* (2013.01); *B64F 3/02* (2013.01); *B64C 2201/108* (2013.01)

(58) Field of Classification Search
CPC ....... B64C 39/02; B64C 39/022; B64C 39/10; B64C 2039/105; B64C 2201/027;
(Continued)

(56) References Cited

U.S. PATENT DOCUMENTS

| 4,194,317 A | * | 3/1980 | Kidd | ...................... | A63H 27/02 |
| | | | | | 244/93 |
| 7,273,195 B1 | * | 9/2007 | Golliher | ................. | A63H 27/12 |
| | | | | | 244/17.11 |

(Continued)

*Primary Examiner* — Richard R. Green
*Assistant Examiner* — Michael A. Fabula
(74) *Attorney, Agent, or Firm* — Neal Marcus

(57) ABSTRACT

A tethered aerial vehicle, connected to an anchorage system in the ground level through a cord, comprising a pair of fixed wings; and a drive assembly. The drive assembly comprises at least two actuators configured to tilt the axle of the propellers. The fixed wings define a center hole located close to a gravitational center of the aerial vehicle. Within the edges of the center hole located close to the gravitational center of the aerial vehicle is a gimbal anchored to the fixed wings' structure. The drive assembly is located within the edges of the center hole and attached to the gimbal in a manner that the gimbal interfaces the connection between the fixed wings and the drive assembly. The drive assembly comprises of at least two propellers mounted on the same axle ("coaxial propellers") driven by a counter-rotating motor. The coaxial propellers are configured to rotate in opposite directions with respect to each other.

20 Claims, 5 Drawing Sheets

(58) Field of Classification Search
CPC .......... B64C 2201/028; B64C 2201/06; B64C 2201/066; B64C 2201/123; B64C 2201/127; B64C 2201/148; B64F 3/00; B64F 3/02
See application file for complete search history.

(56) References Cited

U.S. PATENT DOCUMENTS

| | | | |
|---|---|---|---|
| 9,598,170 | B2 | 3/2017 | Vander Lind |
| 2010/0013226 | A1* | 1/2010 | Blumer .................... F03D 1/00 290/44 |
| 2010/0013236 | A1* | 1/2010 | Carroll ................... F03D 3/005 290/55 |
| 2010/0026007 | A1* | 2/2010 | Bevirt ..................... F03D 5/00 290/55 |
| 2010/0308174 | A1* | 12/2010 | Calverley ............ B64C 39/022 244/155 A |
| 2012/0037750 | A1* | 2/2012 | Dvoeglazov ............ B66F 19/00 244/17.17 |
| 2014/0326831 | A1* | 11/2014 | Vander Lind .......... A63H 27/08 244/155 A |
| 2014/0361122 | A1* | 12/2014 | Ruiterkamp ........... H02G 11/02 244/154 |
| 2015/0041598 | A1* | 2/2015 | Nugent ................. B64C 39/022 244/53 R |
| 2015/0097086 | A1* | 4/2015 | Schaefer ............... B64C 39/022 244/175 |
| 2015/0184637 | A1 | 7/2015 | Vander Lind et al. |
| 2015/0251754 | A1 | 9/2015 | Vander Lind |
| 2015/0298806 | A1 | 10/2015 | Vander Lind et al. |
| 2015/0360776 | A1* | 12/2015 | Briod ..................... B64C 17/00 244/23 A |
| 2015/0375874 | A1 | 12/2015 | Patten et al. |
| 2016/0002013 | A1 | 1/2016 | Hachtmann et al. |
| 2016/0032895 | A1 | 2/2016 | Weddendorf et al. |
| 2016/0083115 | A1 | 3/2016 | Hess |
| 2016/0207626 | A1* | 7/2016 | Bailey ..................... B64C 31/06 |
| 2020/0189712 | A1* | 6/2020 | Briod ................... B64C 39/028 |

\* cited by examiner

TETHERED AERIAL VEHICLE WITH
GIMBALED COAXIAL PROPELLERS

BACKGROUND

Tethered air vehicles are flying equipment attached to the ground through a cable that can lift a payload in the air for one or more of the following supporting forces: aerodynamic, aerostatic or propulsive. These vehicles generally operate in altitudes of tens and hundreds of meters high. They have been standing out as solutions in the telecommunications, monitoring and surveillance fields.

DETAILED DESCRIPTION

Figure 1:
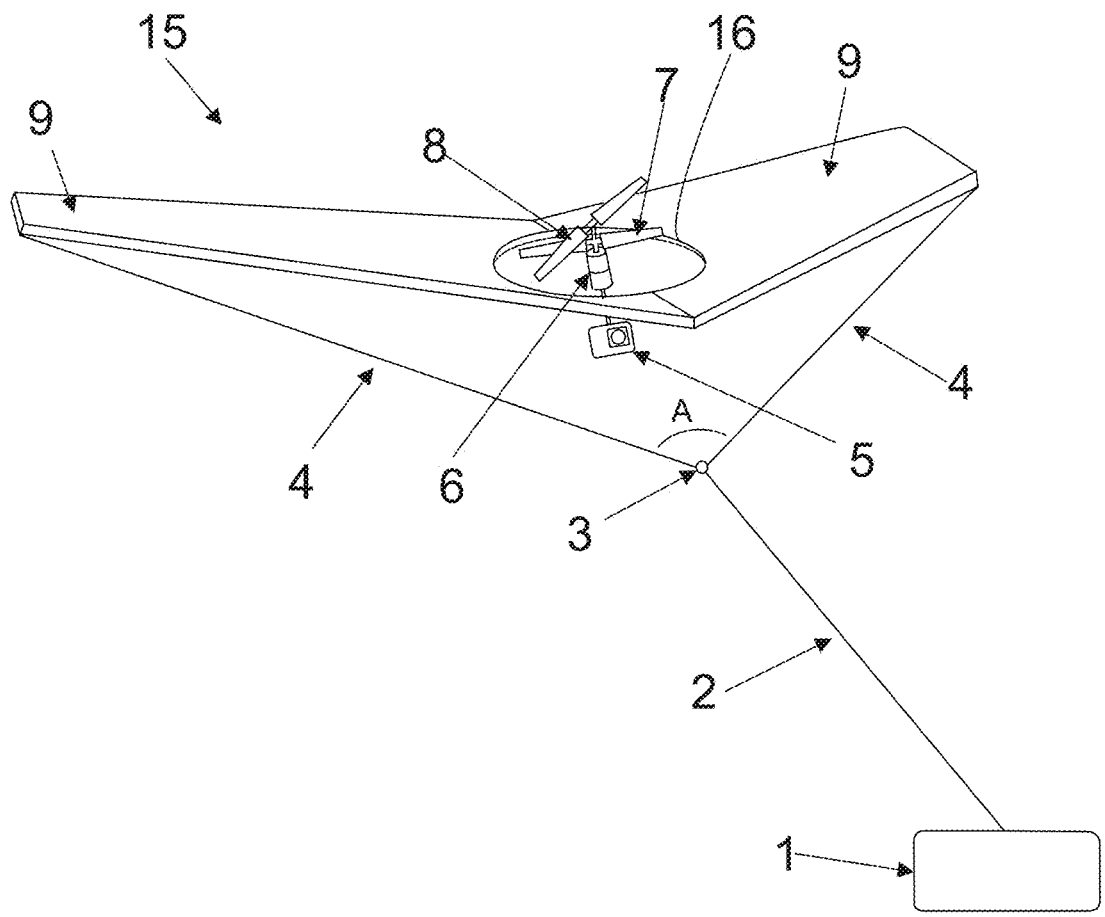
FIG. 1 is a perspective upper view of the tethered aerial vehicle of an embodiment of the present invention connected to an anchorage system in the ground level by means of a cord.

The invention consists of a tethered aerial vehicle, connected to an anchorage in the ground level through a cord. The tethered aerial vehicle comprises a pair of fixed wings and one drive assembly.

The fixed wings of the aerial vehicle define a center hole located at a gravitational center of the vehicle. Within the edges of the center hole there is a gimbal anchored to the fixed wings structure by the inner margin of the hole.

The drive assembly is also located within the edges of the aforesaid center hole and is attached to the gimbal in a manner that the gimbal interfaces the connection between the fixed wings and the drive assembly, providing several degrees of angular freedom between the rotor and the fixed wings.

The rotor consists of at least two propellers mounted on the same axle (referred to as coaxial propellers), i.e., mounted along the same axis, driven by a counter-rotating motor, the coaxial propellers being capable of rotating in opposite directions with respect to each other.

The drive assembly comprises at least two servomotors capable of tilting the propeller's axle in at least four directions. One or more embodiments of the present invention suggest the use of an aerial vehicle that combines features of rotating and fixed wings vehicles. This setup allows the vehicle 15 to fly with its payload 5 using the vertical propulsion generated by the propellers 7, 8 (the rotational wings). On the other hand, the vehicle's fixed wings 9 reveal a great utility on the presence of winds. The fixed wings 9 together with the cord 2 make it possible for the vehicle 15 to function as a kite, since the biggest part of the sustainment comes from aerodynamic effects stemmed from the interaction between the wind and the wings 9.

An objective of one or more embodiments of the present technology is to unravel the flaws related to the complexity involved in the electronic control of the control surfaces of the prior art aerial tethered vehicles.

Another objective of one or more embodiments of the present technology is to enable a tethered aerial vehicle to lift payloads in the air with high reliability and with minimum size and weight.

Another objective of one or more embodiments of the present technology is to decrease the cost of production of a tethered air vehicle.

Another objective of one or more embodiments is to reduce the engine power needed for flight with the use of aerodynamic force over fixed wing.

Another objective of one or more embodiments is to create a tethered aerial vehicle that doesn't need active control to fly.

Another objective of one or more embodiments is to have the sustainment force always in the vertical direction pointing upward.

Another objective of one or more embodiments is to simplify the payload stabilization by attaching it to the drive assembly gimbal.

Another objective of one or more embodiments is to achieve an affordable aerial vehicle with increased autonomy and flying endurance.

Figure 2:
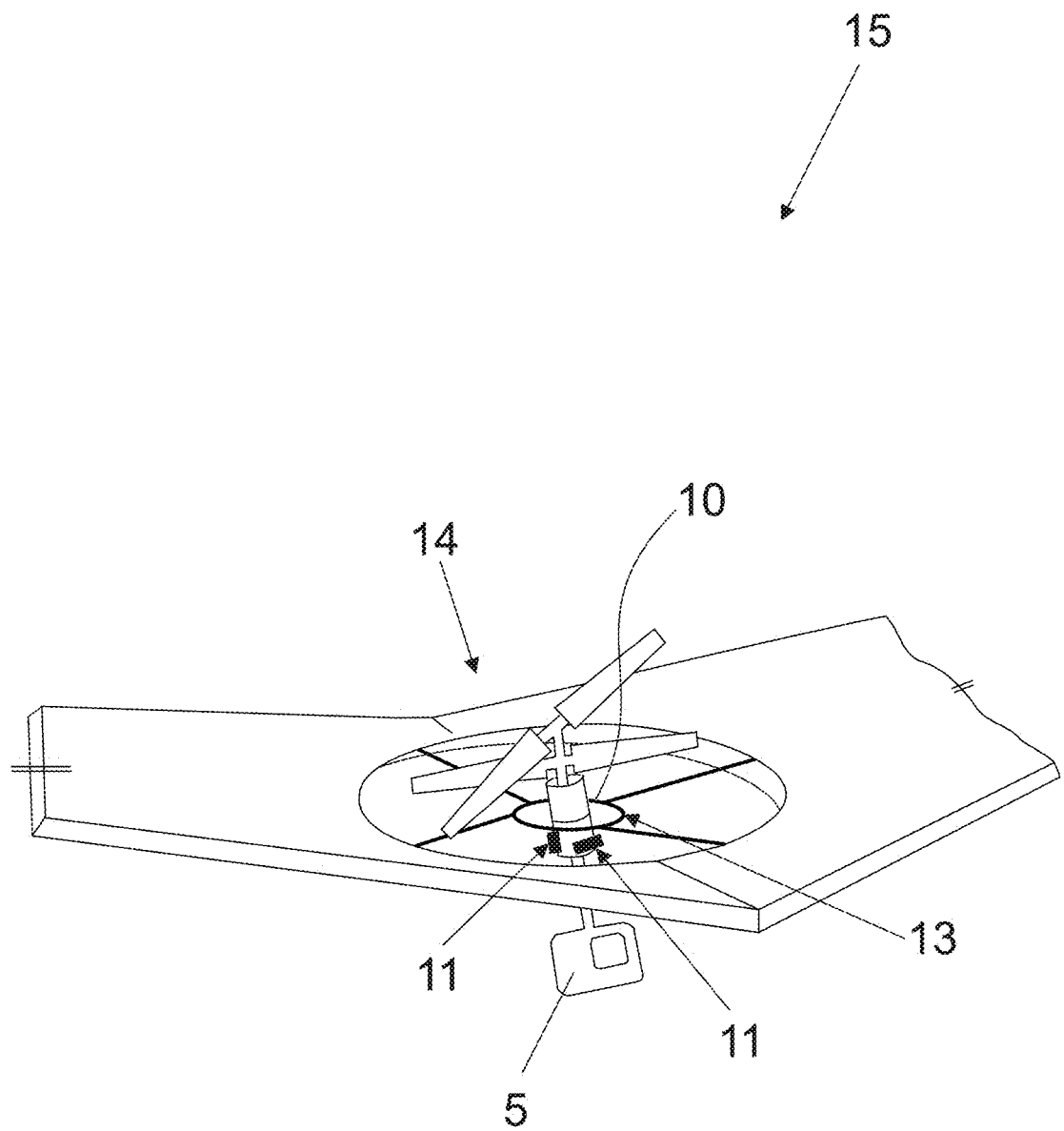
FIG. 2 is a zoomed perspective upper view of the core of tethered aerial vehicle of an embodiment of the present invention with a strategic cut in the fixed wings in order to fit the image in the page limits.
Figure 5:
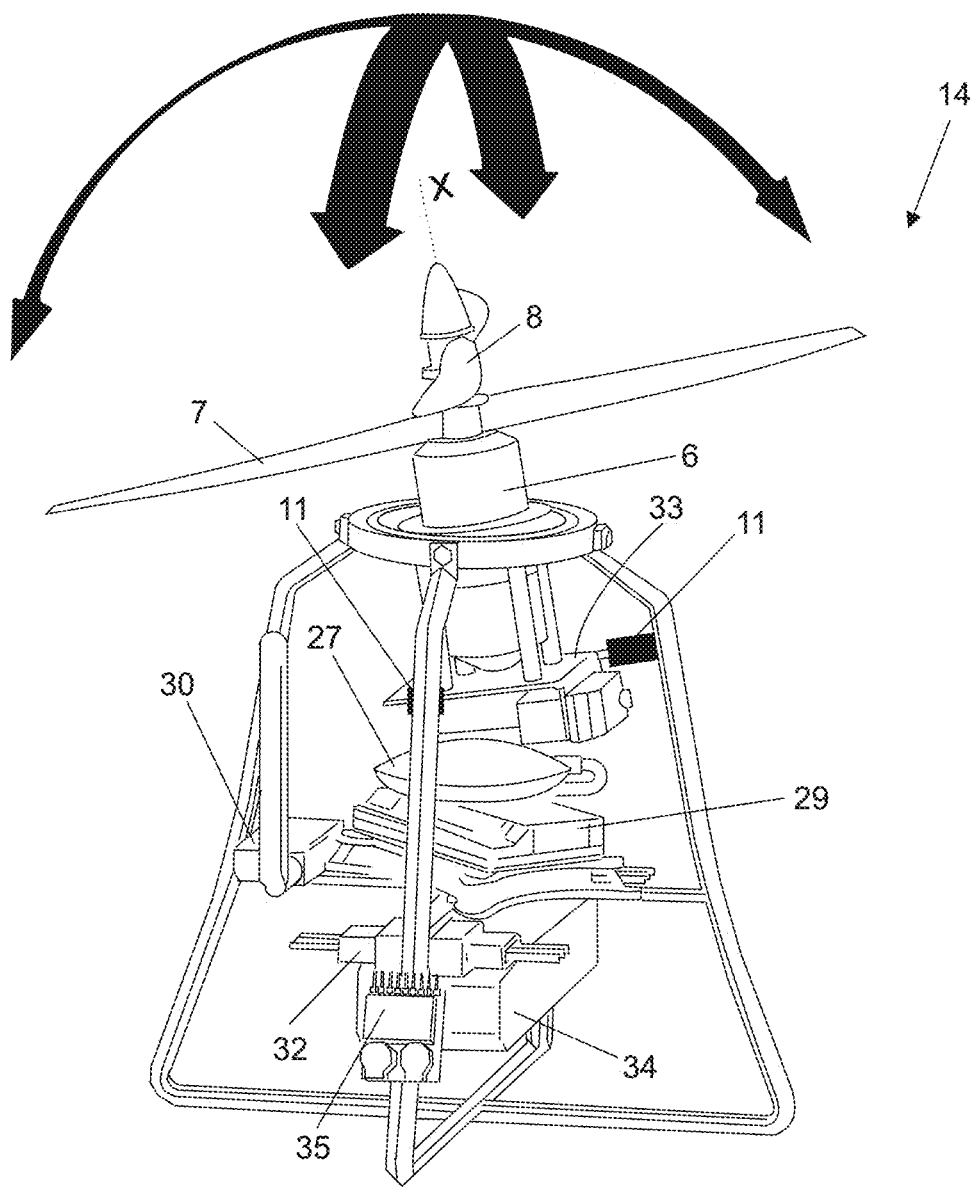
FIG. 5 is a perspective view of the drive assembly of an embodiment of the present invention with the propellers inclined to the left.

As depicted on FIGS. 1 and 2, at least one embodiment of the invention comprises a pair of fixed wings 9 with a center hole 16 in the core region of the fixed wings 9 (in at least one embodiment, the center hole 16 is close to the gravitational center of the wings 9), said hole comprising a drive assembly 14 in its center. The drive assembly 14 has at least two coaxial rotational wings (the propellers 7, 8) capable of rotating in opposite directions; the rotational wings being controlled by two servomotors 11, capable of tilting the drive assembly axis X in at least four directions (north; south; west; east) as depicted in FIG. 5.

The vehicle's main structure (defined by the fixed wings 9) is connected to the cage 13; the cage 13 surrounds a gimbal 10; the gimbal 10, by its turn, holds a counter-rotating motor 6 inside itself. This gimbal 10 can spin around two axis that can be controlled by at least two servomechanisms 11, this way the drive assembly s' axis X and consequently, the thrust generated by the propellers 7 and 8 can be guided through these servomotors 11 action.

In at least one embodiment, the gimbal 10 is comprised of three concentric metal rings. The innermost ring is fixed in relation to the counter-rotating motor 6 and the propeller's axle; the outermost ring is fixed in relation to the cage 13; and the three rings are pivotably attached to each other.

In at least one embodiment, the tethered aerial vehicle 15 is connected to an anchorage system 1 in the ground level by means of a main cord 2 and a pair of strings 4. The confluence point 3 in the intersection of the two strings 4 and the main cord 2 defines a "Y" shape.

Figure 3:
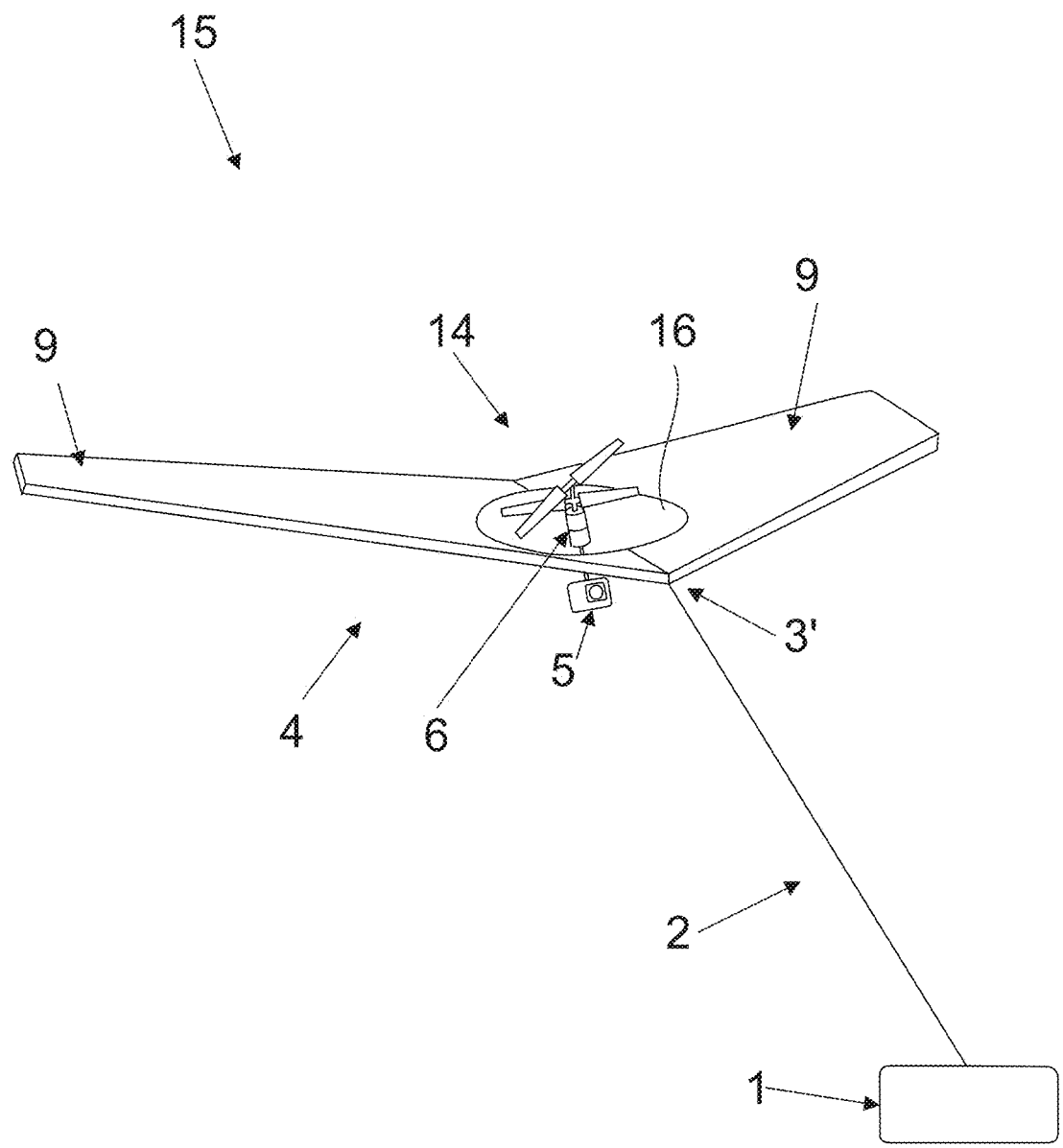
FIG. 3 is a perspective upper view of the tethered aerial vehicle of another embodiment of the present invention connected to a anchorage system in the ground level, by means of a cord.

The presence of the two strings 4, instead of a direct connection such as the one depicted in FIG. 3, assigns much more stability to the aerial vehicle 15.

Another configuration in accordance with an embodiment is one in which the angle A defined among the two strings 4 (see FIG. 1) is set between 15° and 130°. This configuration was proven to give higher stability to the aerial vehicle as compared to other approaches.

Alternatively, the aerial vehicle 15 may reveal a simpler form of connection with its cord 2, as shown at point 3' in FIG. 3. Although it is possible to connect the cord 2 straight to the vehicle's frontal corner, this decreases the stability of the vehicle 15, when compared to the set depicted in FIG. 1.

In at least one embodiment, the payload 5 (see FIGS. 1 and 2) is aligned with the drive assembly's axis X. This feature keeps the trust vector vertical and the payload's horizontal plane stabilized. This arrangement dismisses the use of extra gimbals for the payload 5 allowing the production of a rather compact and optimized vehicle 15.

The payload 5 should be understood as any sort of device carried by the aerial vehicle 15. For instance, the payload 5 may be a surveillance camera; a speaker box; a life buoy; a container for fertilizers, seeds or pesticides; a weapon; a hose; a fire extinguisher; or a basket for carrying goods to be transported from point A to point B; just to mention a few examples.

Figure 4:
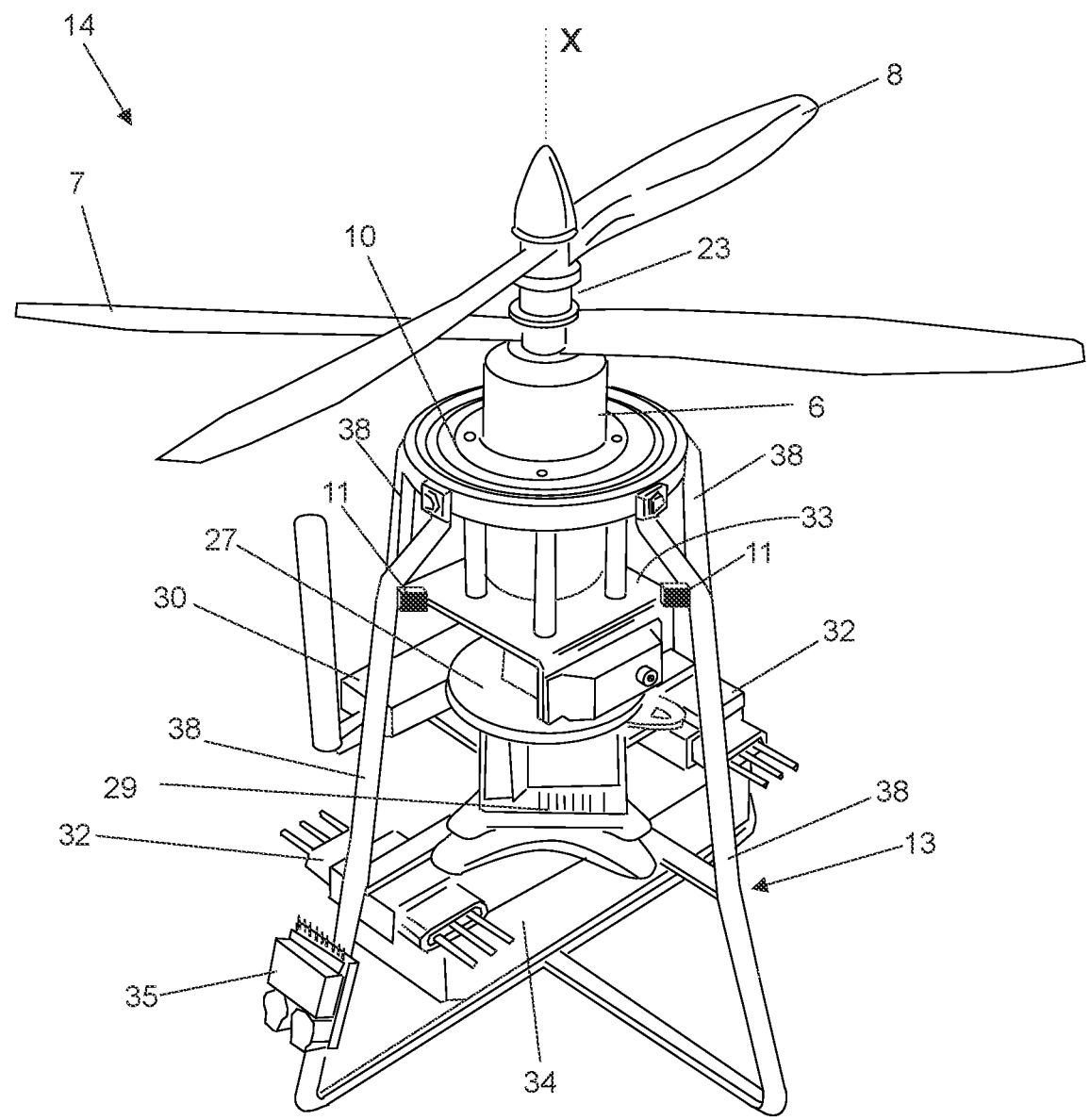
FIG. 4 is a perspective view of the drive assembly of an embodiment of the present invention.

As described above, the aerial vehicle 15 comprises two coaxial propellers 7, 8 (see FIG. 4). The system's propulsion comes from the rotation, in opposite directions, of the coaxial propellers 7, 8, both driven by a counter-rotating motor 6. This feature allows the thrust generated by each propeller 7, 8 to be individually added and the torques to be balanced. Since the clockwise movement of the top propeller 8 counteracts the anti-clockwise movement of the bottom propeller 7, there is no need for a tail rotor or a control surface compensation to counter act a yawing effect on the aircraft.

The counter-rotating motor 6 and the propellers 7, 8 are laid on a mechanism that allows the movement inside two degrees of liberty compared to the vehicle's 15 main structure.

Two servomechanisms 11 control the propellers' position in respect to the cage 13 (see FIGS. 4 and 5). The cage 13 being defined as the metal frame that surrounds the propellers 7, 8, the motor 6 and all the peripheral equipment attached therethrough (in the embodiment revealed in FIGS. 4 and 5, the cage 13 has four vertical rods 38 united in the bottom of the structure in a cross pattern).

The coaxial propellers 7, 8 also extinguishes one of the tethered aerostats' problems, which is the high amplitude and the slow period at the yawing. In at least one embodiment, this problem is avoided by controlling the rotation of each propeller 7, 8 independently, allowing the vehicle to guide its north in a convenient way, rapidly correcting its orientation in the presence of low magnitude wind gusts, which in the end makes the vehicle less susceptible to spatial dislocations.

Since the aerial vehicle 15 comprises a pair of fixed wings 9, it may obtain sustainment through the winds, inspired on a kite's flying principle. This way the vehicle's flight will happen in two stages: (i) the first stage happens when the vehicle is taking off and when there is not too much wind, so the biggest part of the propulsion comes from the rotating wings; (ii) the second stage happens when the vehicle has already reached its final altitude, the cord 2 is stressed and there is presence of strong winds, at this stage the fixed wing is responsible for the biggest part of the sustainment and it is possible to reduce or even cease the motor's effort.

Furthermore, since the vehicle 15 has most its sustainment from aerodynamic forces to the fixed wing 9 it can fly without active control. During flight as the cord 2 is stressed the landing is safer and simpler because it involves merely retrieving the cord 2.

The fixed wings 9 can be implemented, in at least two ways:
Fabric: This way a structure filled by a light stressed tissue would be built. In this scenario, the wing's shape should be flat.
Light monokote structure: a structure of light material such as balsa wood, coated with some sort of plastic film, such as monokote film.

The anchorage system 1 is located at the ground level and has the ability to control the vehicle's 15 altitude. This control can be achieved by rolling the cord 2 on a reel associated to an electric motor and a proper transmission means. Said electric motor is capable of spinning in opposite directions, allowing the cord 2 to be collected or released as demanded.

The anchorage system 1 can be fixed to the ground or to any terrestrial or aquatic vehicle such as cars or boats just to name a few examples.

The landing should be done by tensioning the cord 2 with a force higher than the force the wind exerts on the fixed wings 9. Alternatively, the vehicle's altitude may be controlled by changing its attack angle of the wings 9 and reducing the wings' sustainment until a soft descent movement has initiated. After landing, the loose cord 2 may be collected manually.

In another embodiment of the invention, an electric power source is connected between the anchorage system 1 and the vehicle 15 though the cord 2. As the cord 2 can be rolled in a spinning reel and the power source is fixed with regards to the ground, a slip ring device may be used so that the electric power transmission is made through the rotating reel.

The voltage and the current transmitted can be either DC or AC. The voltage should not be low, in at least one embodiment it stands between 200 and 1000 Volts, since the higher the voltage, the smaller the current, and consequently, the shorter the losses due to the cord's 2 resistance.

The tethered air vehicle 15 also includes a communication system, which is used to transmit the information obtained from the payload 5 all the way to the ground. To establish that communication there are at least three options:
Power Line Communication (PLC): Communication that transmits data through the same wires used for power transmission. To make that happen an emitting device in the vehicle 15 and a receiver device on the ground are used. The emitting device emits a high frequency signal, which is interpreted by a receiver on the ground.
Dedicated communication through the cable: In this case, a new communication channel (inside the cable), would be used such as optic fiber or a conductive wire set.
Wireless communication: Transmits data through electromagnetic waves using the radio frequency spectrum (for this configuration, an embodiment according to the invention comprises the radio antenna 30 depicted in FIGS. 4 and 5).

FIGS. 4 and 5 of the present document depict the drive assembly 14 of the aerial vehicle 15.

In at least one embodiment, the drive assembly 14 comprises: a first propeller 7 and a second propeller 8; one shaft adapter 23; one metal cage 13; two servomotors 11; a GNSS (Global Navigation Satellite System) device 27; one anti-vibration platform 29; one radio antenna 30; two speed control devices 32; one battery 24; and one voltage monitor (e.g., Voltwatch) 35.

The metal cage 13 comprises four vertical rods 38 (in at least one embodiment the rods are made of extruded aluminum alloy) spaced apart from each other, bending themselves in the bottom of the structure and forming a cross in the intersection of their bodies therein.

Inside the metal cage 13, there is a metal tray 33 associated with a gimbal 10. Above the metal tray and bellow the gimbal 10 stands the counter-rotating motor 6 (which, according to at least one embodiment, is designed to control simultaneously and independently the movement of each propeller 7, 8). The physical link between the metal tray 33 and the cage 13 is exerted by the servomotors 11. The servomotors 11 may shift the metal tray 33 in four directions (left, right, frontwards and backwards), bending the propellers 7, 8 in several degrees of freedom.

Bellow the tray 33, but still comprised inside of the cage 13, there is described and shown: the GNSS device 27; the radio antenna 30; an anti-vibration platform 29 (to ensure durability and stability to all electronic components of the system); a battery 34 (which may be continuously fed by the electricity provided by the cord 2); two speed control devices 32; and an electronic processor (not revealed in the figures). Further, in the outer surface of the cage 13, the drive assembly 14 may comprise a Voltwatch 35.

One or more embodiments according to the present invention achieve one or more, or all the objectives it was designed to achieve, inasmuch as: the combination of the two strings 4 defining an "Y" shape with the cord 2; together with the counter rotating propellers 7, 8; the gimbal 10; the two servomotors 11; and the co-axial association of the payload 5 with the drive assembly 14; all of these features combined, allow for a much more reliable and affordable tethered aerial vehicle 15, which does not require control surfaces (such as winglets, flaps, rudders, elevators and ailerons) to perform in an steady manner.

During tests, the aerial vehicle 15 of an embodiment of the present invention achieved a fight endurance of more than 48 hours under regular weather conditions. The vehicle 15 revealed a unitary production cost comprised below 30% the average sales price of a tethered vehicle with the same dimensions.

One or more embodiments according to the present invention have been described herein in considerable detail in order to provide those skilled in the art with the information needed to replicate the knowledge revealed herein. However, it is to be understood that the invention is not limited to the particular embodiment that has been described in the present specification, and may be carried out with various modifications, without departing from the scope of the invention itself.

The invention claimed is:

1. A tethered aerial vehicle configured to be connected to an anchorage system on the ground level through a cord, the aerial vehicle comprising:
   a plurality of wings fixed to one another, the plurality of wings define a center hole located in proximity to a gravitational center of the aerial vehicle;
   a gimbal (1) positioned within the center hole located close to the gravitational center of the aerial vehicle and (2) anchored to the plurality of wings at an inner margin of the center hole; and
   a drive assembly, the drive assembly is located within the center hole, the drive assembly comprises:
      at least two propellers mounted along a same axis and configured to be driven by a counter-rotating motor that is held by the gimbal, the at least two propellers are configured to rotate in opposite directions with respect to each other;
      a cage connected to the plurality of wings and surrounding the gimbal so as to enable the gimbal to pivot with respect to the cage; and
      at least two servomotors configured to tilt the at least two propellers along the same axis in at least four directions with respect to the cage and the plurality of wings, wherein the drive assembly is attached to the gimbal in a manner that the gimbal interfaces with a connection between the plurality of wings and the drive assembly, thereby providing several degrees of angular freedom between the drive assembly and the plurality of wings.

2. The tethered air vehicle according to claim 1, wherein the two propellers are controlled inside the aerial vehicle or remotely from the tethered air vehicle.

3. The tethered air vehicle according to claim 1, wherein the servomotors are configured to control the gimbal to move around two axes, thereby enabling the at least two propellers to tilt along the same axis in the at least four directions.

4. The tethered air vehicle according to claim 1, wherein the cord is connected to the vehicle by a pair of strings, said pair of strings being united with the cord in a confluence point, defining a "Y" shape in the union of strings and cord, where an angle defined as the shortest distance between the strings is comprised between 15° and 130°.

5. The tethered aerial vehicle according to claim 1, wherein the vehicle comprises a payload, said payload being aligned with the axis of the two propellers.

6. The tethered aerial vehicle according to claim 1, wherein the cage being defined by four vertical rods that bend in the bottom of the drive assembly in the shape of a cross.

7. The tethered aerial vehicle according to claim 1, wherein the drive assembly comprises a Global Navigation Satellite System (GNSS) device.

8. The tethered aerial vehicle according to claim 1, wherein the drive assembly comprises a radio antenna for communication purposes with ground-based equipment.

9. The tethered aerial vehicle according to claim 1, wherein the drive assembly comprises a battery.

10. The tethered aerial vehicle according to claim 1, wherein the drive assembly comprises an anti-vibration platform configured to securely hold electronic components of the drive assembly.

11. The tethered aerial vehicle according to claim 1, wherein the drive assembly comprises at least two speed control devices.

12. The tethered aerial vehicle according to claim 1, wherein the gimbal comprises at least two concentric rings including an inner ring and outermost ring, the innermost ring is fixed in relation to the counter-rotating motor and the axis of the at least two propellers, the outermost ring is fixed in relation to the cage and the at least two concentric rings are pivotably attached to each other.

13. The tethered aerial vehicle according to claim 12, wherein the drive assembly comprises a voltage monitor disposed at the outer surface of the cage.

14. The tethered aerial vehicle according to claim 1, further comprising a payload aligned with an axis of the drive assembly.

15. The tethered aerial vehicle of claim 1 wherein the plurality of wings are fixed to one another in an angular configuration.

16. A tethered aerial vehicle configured to be connected to an anchorage system on the ground level through a cord, the aerial vehicle comprising:
   at least two wings fixed to each other, the at least two wings define a center hole located in proximity to a gravitational center of the tethered aerial vehicle;
   a gimbal positioned within the center hole located close to the gravitational center of the aerial vehicle; and
   a drive assembly located within of the center hole, the drive assembly comprising:

at least two propellers mounted along a same axis and configured to be driven by a counter-rotating motor that is held by the gimbal, the at least two propellers are configured to rotate in opposite directions with respect to each other;

a cage connected to the plurality of wings and configured to support the gimbal so as to enable the gimbal to pivot with respect to the cage; and at least two servomotors configured to tilt the at least two propellers along the same axis in at least two directions with respect to the cage.

17. The tethered aerial vehicle of claim 16 wherein the at least two fixed wings are configured in an angular configuration with respect to each other.

18. A tethered aerial system including a tethered aerial vehicle, an anchorage system on the ground and a cord connecting the tethered aerial vehicle to the anchorage system, the aerial vehicle comprising:

at least two wings fixed to each other, the at least two wings define a center hole located in proximity to a gravitational center of the tethered aerial vehicle;

a gimbal positioned within the center hole located close to the gravitational center of the aerial vehicle; and a drive assembly located within the center hole, the drive assembly comprising:

at least two propellers mounted along a same axis and configured to be driven by a counter-rotating motor that is held by the gimbal, the at least two propellers are configured to rotate in opposite directions with respect to each other;

a cage connected to the plurality of wings and configured to support the gimbal so as to enable the gimbal to pivot with respect to the cage;

at least two servomotors configured to tilt the at least two propellers along the same axis in at least four directions with respect to the cage.

19. The tethered aerial vehicle according to claim 18, wherein the cord is configured to provide electricity from the anchorage system to the aerial vehicle.

20. The tethered aerial vehicle according to claim 18, wherein the cord is configured to deliver electronic communication between the anchorage system and the aerial vehicle.

* * * * *